O. P. COMBEST.
BEET TOPPING ATTACHMENT FOR BEET HARVESTING MACHINES.
APPLICATION FILED JAN. 4, 1918.
1,379,530.
Patented May 24, 1921.
4 SHEETS—SHEET 4.
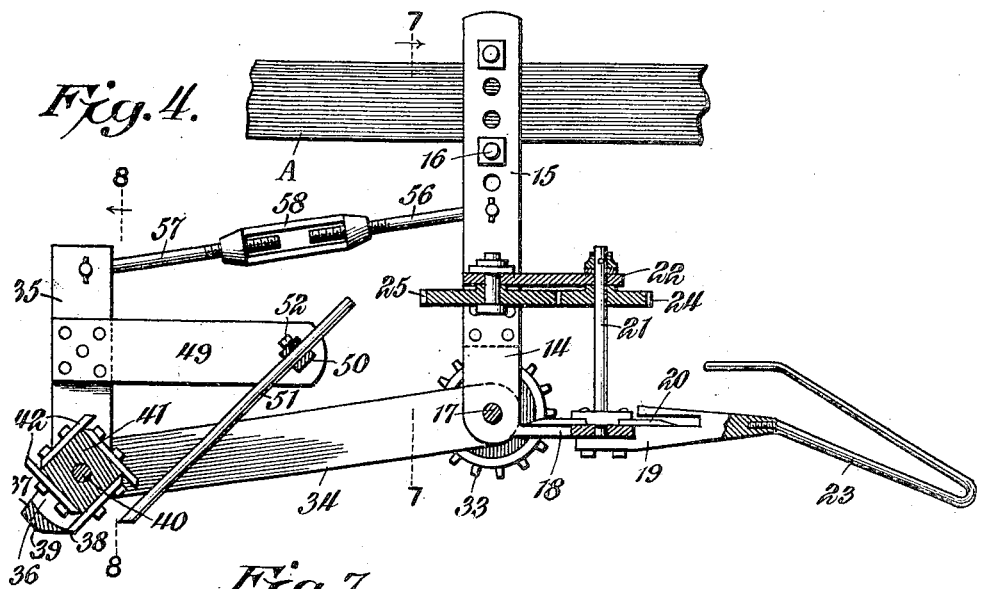
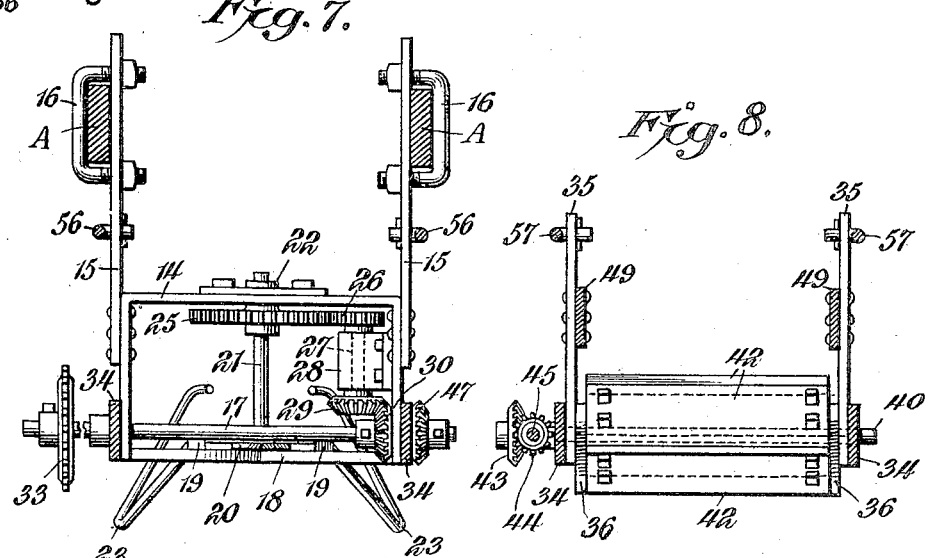
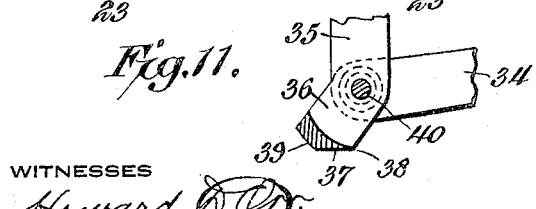
O. P. Combest, INVENTOR,
BY E. G. Siggers
ATTORNEY
WITNESSES
Howard D. Orr

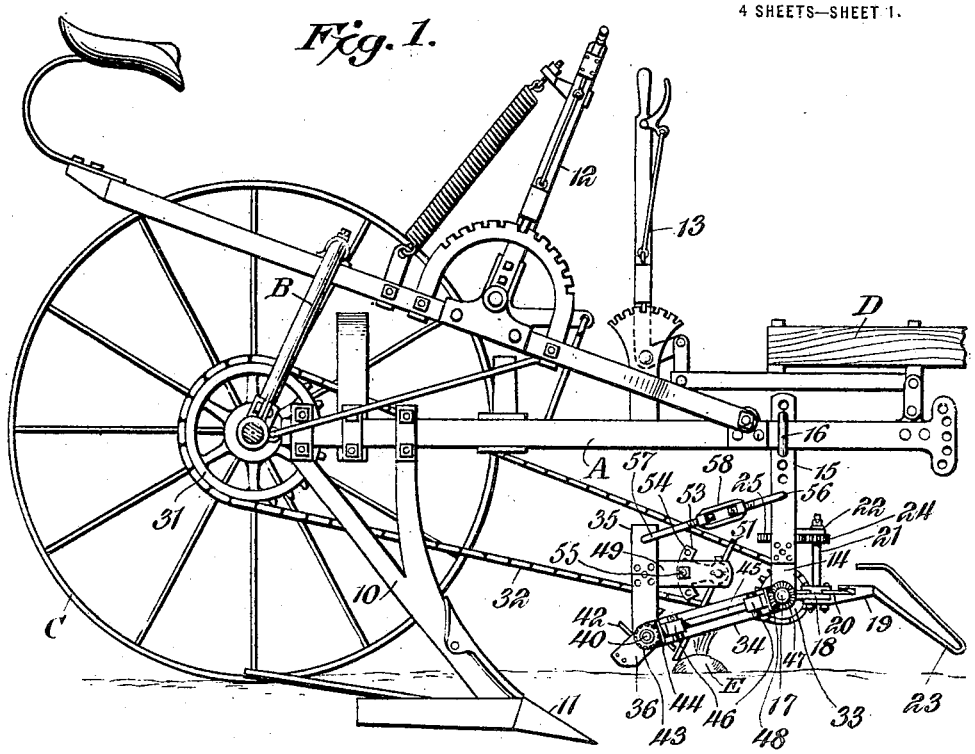

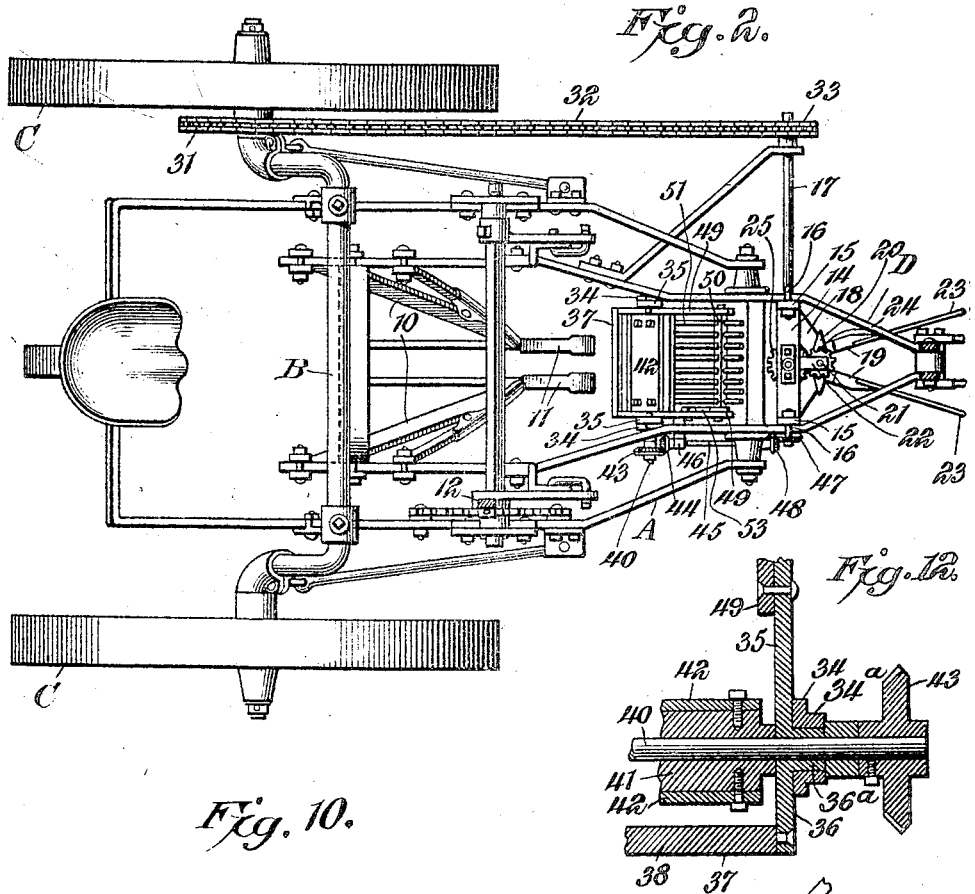
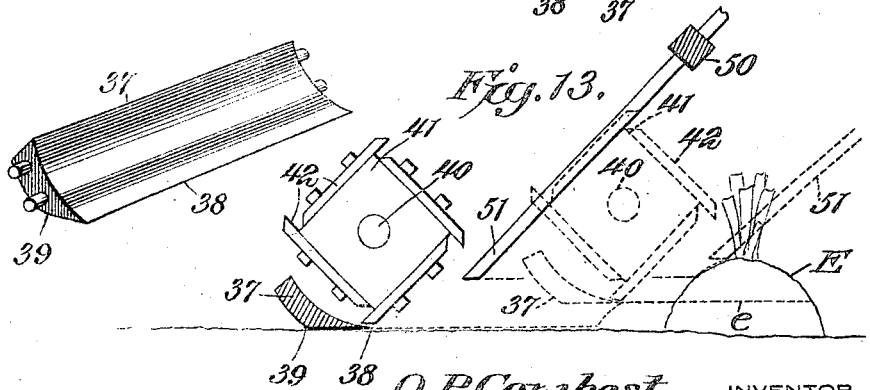

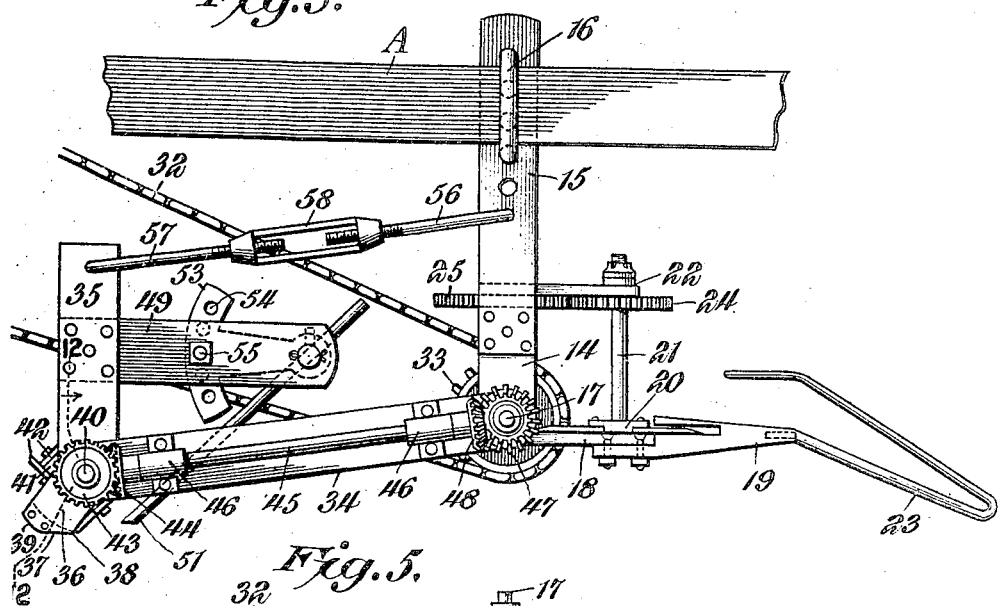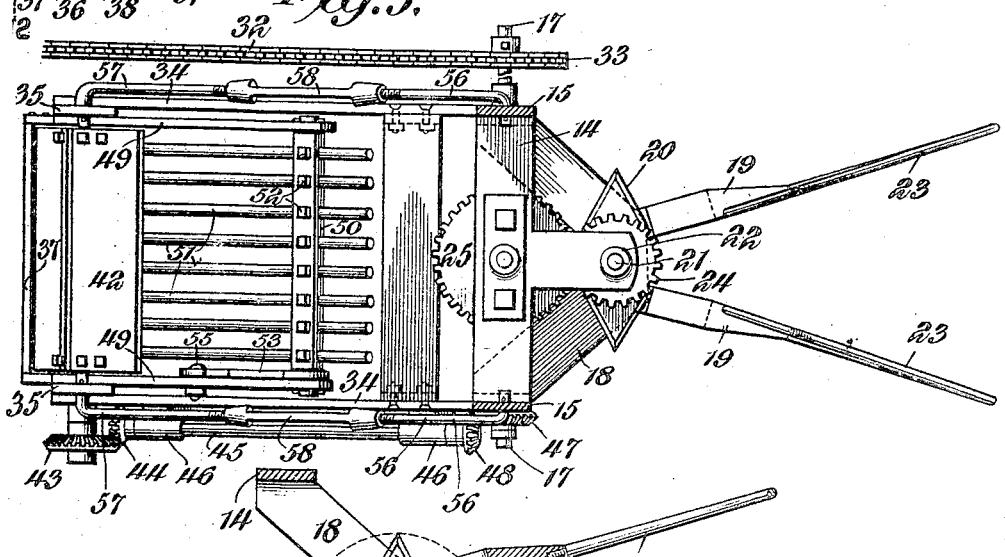

UNITED STATES PATENT OFFICE.

OLIVER P. COMBEST, OF POMONA, CALIFORNIA.

BEET-TOPPING ATTACHMENT FOR BEET-HARVESTING MACHINES.

1,379,530.  Specification of Letters Patent.  Patented May 24, 1921.

Application filed January 4, 1918. Serial No. 210,297.

*To all whom it may concern:*

Be it known that I, OLIVER P. COMBEST, a citizen of the United States, residing at Pomona, in the county of Los Angeles and State of California, have invented a new and useful Beet-Topping Attachment for Beet-Harvesting Machines, of which the following is a specification.

The invention relates to beet toppers, and more particularly to the class of beet toppers for use with sugar beet harvesting machines.

The primary object of the invention is the provision of a beet topper which can be adjustably mounted upon the frame of a beet puller of any well known construction, for the automatic removal of the beet foliage and tops, so that in a single operation the foliage may be cut off, the beets in the row or rows may be topped, and the beets left in the ground may be pulled on the advancement of the machine, thereby eliminating separate operations for this purpose.

Another object of the invention is the provision of an attachment of this character, wherein the foliage cutter and the topper knives are mounted in a novel manner, so that the same can be adjusted to vary the elevation thereof relative to the ground, thus regulating the cutting operation in the topping of the beets.

A further object of the invention is the provision of a topper of this character, which is comparatively simple in construction, thoroughly reliable and effective in its operation, easily mounted upon or removed from the beet pulling machine, which is capable of use singly or in a gang, and which may be manufactured at a minimum expense and installed with despatch.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the accompanying drawings:—

Figure 1 is an elevation partly in section of a beet puller of the riding type, showing the topper attachment constructed in accordance with the invention.

Fig. 2 is a top plan view thereof.

Fig. 3 is an enlarged side elevation of the attachment removed from the beet puller.

Fig. 4 is a longitudinal sectional view thereof.

Fig. 5 is a plan view.

Fig. 6 is a fragmentary horizontal sectional view of the foliage cutter and gathering fingers.

Fig. 7 is a vertical transverse sectional view on the line 7—7 of Fig. 4.

Fig. 8 is a sectional view on the line 8—8 of Fig. 4.

Fig. 9 is a detail plan view of the gage detached.

Fig. 10 is a perspective view of the ground knife.

Fig. 11 is a fragmentary detail view of the ground knife supporting frame.

Fig. 12 is a detail sectional view taken on the line 12—12 of Fig. 3.

Fig. 13 is a diagrammatic view illustrating the action of the topping knives which are controlled by the gage.

Similar reference characters indicate corresponding parts throughout the several views in the drawings.

Referring to the drawings in detail, A designates generally the main frame, B the axle, C the traction wheels and D the front draft rigging of a beet pulling machine which is of the ordinary well known riding type. Supported by the main frame A and depending therefrom are the standards 10 supporting the beet pulling shares or diggers 11, which constitute the beet pullers to engage the beets and lift the same above the surface of the soil after the foliage has been removed and the tops cut off. The shares or diggers 11 are of the usual construction and are connected with the frame A and a suitable lever mechanism 12, which is mounted upon said frame and is operatively connected with said shares or diggers so as to raise or lower the same with relation to the frame of the machine.

The draft rigging D is connected with lever mechanism 13 mounted upon the frame A so that said rigging can be adjusted to vary the disposition thereof for the successful operation of the beet puller. The riding type of beet puller shown and herein briefly described is merely illustrated for the purpose of gaining a clear understanding of the construction of mounting and manner of operation of the beet topper attachment hereinafter fully described, and which constitutes my invention.

The beet topper attachment comprises an inverted substantially U-shaped front frame 14, (Fig. 7) to which are fixed at opposite sides thereof vertical uprights or standards 15 and constituting therewith adjustable hangers. The standards are formed with suitable holes for the adjustable engagement therein of clips 16 which embrace the side bars of the main frame A of the beet puller. Mounted transversely in the side legs of the frame 14 is a horizontally disposed shaft 17, and fixed to the lower end of said legs and extending forwardly in a horizontal plane, is a substantially V-shaped support 18 (Figs. 2, 5 and 6) having secured thereto forwardly extending diverging arms 19, constituting knife guards for a rotatable double-pointed, substantially diamond-shaped knife 20, which is fixed to a vertical stud shaft 21 journaled centrally in the support 18, and also in a bearing 22 provided on and projecting forwardly from the frame 14 centrally thereof. Detachably engaged in the front end of the knife guards 19 are forwardly extending inclined diverging gathering arms 23, which constitute an entrance therebetween for the beet foliage to be severed by the knife 20 in the operation thereof. (Fig. 6.)

The gathering arms 23 serve to lift the foliage when drooping, or fallen onto the ground, for the straightening of said foliage to assure the cutting thereof by the knife 20 which rotates through the guards 19. These arms are formed with upper and lower branches which are arranged in the same vertical plane, the upper arm being free and more flexible than the lower arm. The shaft 21 carrying the knife is fitted with a gear 24 which meshes with a companion gear 25 journaled centrally in the frame 14 at the closed top thereof, (Fig. 7) and this gear 25 meshes with a pinion 26, which has its shaft 27 journaled vertically in a bearing 28 secured within the frame 14. The shaft 27 is fitted with a bevel gear 29 meshing with a bevel pinion 30 fixed to the horizontal shaft 17, so that upon rotation of the latter, motion will be transmitted therefrom through the shaft 21 to the knife.

Fixed to one of the wheels C of the beet puller is a sprocket wheel 31 over which is trained an endless chain 32, the same being also trained over a sprocket wheel 33 fixed to the extended end of the shaft 17 at one side of the beet puller, so that on the advancement of the latter, motion thereof will be imparted to the shaft 17 for the driving of the same.

It is to be understood that in lieu of the connections between the wheel of the beet puller and the shaft 17 other forms of driving means may be employed. For example, a motor might be mounted upon the frame of the beet puller. Therefore, such modifications or variations are contemplated within the scope of the invention.

Swingingly mounted upon the shaft 17 at opposite sides of the frame 14 and extending rearwardly therefrom, are side rails 34 terminating at their rear ends in bearing collas 34$^a$. (Fig. 12). Posts 35 which extend upwardly and are provided with rearwardly inclined heel extensions 36, between which is arranged a ground knife 37, are provided with bearing collars 36$^a$ mounted to rotate in the collars 34$^a$. The ground knife is riveted or otherwise secured in the extensions 36, and is formed with a forward knife edge 38 and a partly curved and a partly flat bottom face 39, which serves as a shoe adapted to normally ride upon the ground. The ground knife is disposed at an angle by reason of the rearward inclination of the extension so as to bring the partially flat portion of its bottom face substantially level with the ground. Journaled transversely in the posts 35 above the ground knife 37, and passed through the collars 36$^a$ mounted in the collars 34$^a$ of the side rails 34, is a horizontal shaft 40 carrying a cutter supporting block 41 which is of equilateral rectangular shape in cross section and extends approximately the distance between the posts 35. Upon the faces of this block 41 are mounted reversible cutting blades 42, constituting rotary cutters coacting with the ground knife 37 for the severing of the tops of the beets standing in the ground. On the shaft 40 at one end thereof is a bevel pinion 43, meshing with a companion 44, fixed to a countershaft 45, journaled in suitable bearings 46 on one of the side rails 34, while fixed to the shaft 17 is a pinion 47 meshing with a pinion 48 fixed to the countershaft 45, so that motion from the shafts 17 will be imparted through the shaft 45 to the shaft 40 for rotating the block 41 carrying the cutter blades 42 for the operation thereof in topping the beets.

Fixed to the posts 35 are forwardly extending brackets 49, in which is journaled a head 50 having adjustably mounted therein a plurality of fingers 51, which are secured in adjusted position in the head 50 through the medium of set screws 52 threaded therein, and these fingers 51 serve as a gage for regulating the depth of cut for topping the beets when the attachment is in operation. Fixed to the head 50 next to one of the brackets 49 is a segment 53, (Fig. 3), having a series of arcuately disposed spaced holes 54, in any one of which is adapted to be engaged a bolt 55, which is also engageable with the adjacent bracket 49. In this manner, the fingers 51 constituting the gage, may be angularly adjusted either close to or away from the path of movement of the cutter blades 42, for riding upon the upper beet ends protruding from the ground to lift the ground knife 37 onto said ends, and at the same time regulate the position of the top cutter to sever the tops of the beets a predetermined distance relative to the ground surface, or level therewith.

By reference to Fig. 13, it will be seen that the knife 37 in traveling along the ground, with its cutting edge 38 adjusted properly to avoid entering the ground by means of the turnbuckle arrangement, hereinafter described, is caused to assume the position, with relation to the beet (indicated at E) shown in dotted lines, the moment the fingers 51 contact with the beet, the knife in conjunction with the revolving knives 42, severing the top substantially along the line e. Should it be desired to cut off more or less of the tops of the beets, the fingers 51 are adjusted, by means of the set screws 52 and the adjusting arm 53, so as to bring the lower ends of said fingers 51 a greater or less distance above the cutting edge 38 of the knife 37, or a greater or less distance in advance thereof, it being, of course, necessary to keep the fingers out of the rotary path of the knives 42. The latter adjustment may be necessary at times, depending upon the size of the beets and the distance between the same.

Connected with the hangers 15 are the forward rods 56 of a turnbuckle connection, the rear rods 57 thereof being pivotally connected to the upper ends of the posts 35, the front rods 56 being pivotally connected to the hangers, and the buckle 58 adjustably connecting the rods 56 and 57 together, so that on adjustment of the turnbuckle connection, the angle of the ground knife 37 can be adjusted to dispose the same level with the ground. By reason of the loose pivotal connection of the turnbuckle members 56 and 57 with the hangers 15 and posts 35 respectively, and similar pivotal connections of the front ends of the side rails with the shaft 17, and the pivotal connections of the rear ends of said rails and the lower ends of said posts 35 with the shaft 40, it will be seen that the parts 15 and 35 are maintained in parallel relation to each other at all times, the posts 35 being kept vertical in every adjustment of the turnbuckle. The parts 34, 35 and the turnbuckle constitute what might be termed a floating auxiliary frame for the beet topping mechanism. They operate on the principle of the parallel motion.

After the ground knife 37 and the rotary cutter 42 have been adjusted vertically by the turnbuckle, so as to dispose the ground knife level with the ground, the subsequent raising or lowering of these parts by the action of the gage, as previously described, does not disturb or affect such adjustment, which remains fixed until changed by the further adjustment of the turnbuckle.

In the operation of the attachment on the advancement of the beet pulling machine the foliage of the beets is first cut, and subsequently the tops of the beets, and thereafter the latter are extracted from the ground by the beet puller, as will be obvious. The gathering arms 23 direct the foliage of the growing beets into the path of the cutter 20 which in rotation severs the foliage. The ground knife 37 travels upon the ground, and co-acting therewith are the blades 42 which cut the tops of the beets, the knife 37 being held level relative to the ground for the slicing of the tops of the beets as the machine advances, in the manner described.

The gage which includes the fingers 51 is disposed forwardly of the knife 37 and engages with the tops of the beets prior to the cutting thereof, thereby raising the knife 37 the proper distance according to the cut desired, the gage being readily adjustable to vary the depth of the cutting action of the knife.

The blades 42 are formed with opposite cutting edges, and are mounted upon the block 41 to permit reversal of said blades so that when the active cutting edges become dull, the blades can be reversed and the fresh edges thereof used, thereby avoiding the necessity of frequently removing the blades for the sharpening thereof.

The attachment is of a construction to permit a multiple number thereof to be mounted in a beet pulling machine so as to be used in gang form for the topping of several or any determined number of rows of growing beets in a field. The attachment is readily adjustable to vary the elevation thereof relative to the ground.

The heel 39 of the ground knife 37 is adapted to ride upon the topped beets to prevent the bruising of the beets in the advancement of the beet puller.

It is to be understood that changes, variations and modifications may be made in the invention, such as come properly within the scope of the appended claims, without departing from the spirit of the said invention or sacrificing any of its advantages.

From the foregoing it is thought the construction and manner of operation of the attachment will be clearly understood and therefore, a more extended explanation has been omitted.

While the invention has been described as an attachment for beet harvesting machines, it will be understood that the invention may be built into the machine as an inseparable part thereof at the time of the original construction of the harvesting machine.

What is claimed is—

1. The combination with a supporting frame, of an auxiliary frame pivotally connected with said supporting frame and having parallel motion, and beet topping mechanism carried by the rear end of said auxiliary frame, said mechanism consisting of a ground knife and a rotary cutter coöperating therewith, the ground knife having a front cutting edge with its lower face in rear thereof shaped so as to ride along the ground.

2. The combination with a hanger provided with a driven shaft, of side rails pivotally connected to said shaft, vertical posts, means for pivotally connecting the side rails and posts at their lower ends, means for pivotally connecting the upper ends of the posts to the hanger, said posts having rearwardly inclined heel extensions below said pivotal connections, a stationary ground knife carried by and connecting said extensions of the posts and having its front end sharpened and its lower face flattened and held substantially level with the ground, and a rotary cutter coöperating with said ground knife, said cutter being mounted on the first-mentioned pivotal means and maintained at all times in the same relation to the said knife.

3. The combination with a hanger provided with a driven shaft, of side rails pivotally connected to said shaft, vertical posts, means for pivotally connecting the upper ends of the posts to the hanger, a shaft for pivotally connecting the lower ends of the posts to the corresponding ends of the side rails, said posts having rearwardly inclined heel extensions below said shaft, a stationary ground knife carried by and connecting said extensions of the posts and having its front end sharpened and its lower face provided with a heel to ride along the ground and held substantially level with the ground, and a rotary cutter mounted on said shaft above and in advance of the ground knife and having a series of blades coöperating with said knife to effect the cutting of the beets, said cutter being of substantially the same length as said knife.

4. The combination with a hanger carrying a shaft at its lower end, a parallel motion frame pivotally connected at its front end to said hanger and said shaft at spaced points vertically along the hanger, a ground knife carried by said frame and adapted to trail on the ground, a rotary cutter also carried by said frame and associated with the ground knife and comprising a series of blades arranged substantially at right angles to each other, said knife and said cutter being located at the rear end of the frame, gearing carried by said frame and in mesh with a gear on the first-mentioned shaft and a gear on the shaft of the cutter for rotating said cutter, and means for driving the shaft.

5. The combination with a hanger provided with a shaft, of side rails pivotally connected to said shaft, vertical posts, means for pivotally connecting said rails and posts at their lower ends, means for pivotally connecting the upper ends of the posts to the hanger, whereby the posts are maintained in parallelism with the hanger, a ground knife provided at the lower ends of the posts and adapted to trail on the ground, a rotary cutter also carried by said posts and operating in conjunction with the ground knife, a countershaft mounted on one of the side rails, gearing connecting the rear end of said countershaft and the cutter, and other gearing on the front end of the countershaft meshing with and driven by gearing mounted on the first-mentioned shaft.

6. The combination with a main frame, of an auxiliary frame comprising side rails pivotally connected to the frame and extending rearwardly therefrom, upstanding posts pivoted to the rear ends of the side rails, beet topping mechanism carried by the posts and rails, a gage consisting of a head having a plurality of spaced fingers carried thereby, means for pivotally mounting said head in the auxiliary frame, means for adjusting said gage in the arc of a circle, said gage being mounted above and in advance of the beet topping mechanism with the lower ends of said fingers in trailing relation to the ground so as to engage the beets prior to their engagement by the beet topping mechanism whereby to raise the latter.

7. The combination with a main frame, of an auxiliary frame comprising side rails pivotally connected to the main frame and extending rearwardly therefrom, upstanding posts pivoted to the rear ends of the side rails, beet topping mechanism carried by the posts and rails, and a tined gage pivotally supported in the auxiliary frame above and in advance of said topping mechanism, with the lower ends of the tines of said gage spaced forwardly of said mechanism, and means for adjusting the gage so as to move the tines thereof bodily toward and from said mechanism.

8. The combination with a frame, and vertically movable beet topping mechanism, of a pivotally mounted gage to automatically adjust said mechanism relative to the beet so as to regulate the height of cut of said mechanism, said gage including a plurality of spaced fingers arranged in advance of said beet topping mechanism, and means for adjusting said fingers in the arc of a circle toward and away from said beet topping mechanism, said mechanism comprising a segment with a series of holes therein, and a bolt for adjustably connecting said segment to the frame.

9. The combination with vertically movable beet topping mechanism, a gage operated to automatically adjust said mechanism relative to the beet so as to regulate the height of the cut of said mechanism, said gage comprising a plurality of spaced fingers arranged in advance of said beet topping mechanism, and means for adjusting said fingers in the arc of a circle toward and away from said beet topping mechanism.

10. The combination with a hanger provided with a shaft, side rails pivotally mounted at one end to said shaft, posts, a cutter shaft located at the junction of the posts and side rails, means for pivotally connecting the said posts and side rails at their points of intersection, a rotary cutter mounted on the cutter shaft, a ground knife arranged below the cutter and connected with said posts and adapted to trail along the ground, and a relatively fixed gage carried by the posts in advance of the cutter with its lower end located above the plane of the ground knife.

11. In beet topping mechanism, a rotary cutter, a ground knife below said cutter and coöperating therewith, a parallel motion frame carrying said knife and cutter, a gage carried by said frame and located forwardly of the cutter with its lower end above the plane of the ground knife, and means for adjusting the gage in the arc of a circle toward and away from the cutter and ground knife.

12. The combination with vertically movable beet topping mechanism including a ground knife and a rotary cutter, a gage arranged in advance of the knife and cutter and composed of a series of spaced fingers having their lower ends arranged above the plane of the ground knife, and means for adjusting the fingers simultaneously toward and away from said knife and cutter.

13. The combination with vertically movable beet topping mechanism including a ground knife and a rotary cutter, a gage carried by the frame on which said beet topping mechanism is mounted and movable therewith, said gage comprising a series of spaced fingers the lower ends of which are located above the plane and in advance of the knife, and means for adjusting the lower ends of the fingers backwardly and forwardly toward and away from the knife and cutter.

14. The combination of a frame adapted to be carried upon a beet puller, a ground knife disposed rearwardly of said frame and swingingly connected therewith and adapted to trail along the ground, means for leveling the knife relative to the ground, and horizontally acting rotary cutter blades arranged above and coöperating with the knife, said blades being of substantially the same length as said knife.

15. The combination with the frame of a beet-pulling machine, of a vertically movable auxiliary frame, beet topping mechanism carried by said auxiliary frame, said mechanism comprising a stationary ground knife mounted to lie substantially level with the ground, a rotary cutter mounted above and in advance of the said knife and coöperating therewith to effect the cutting of the beet tops, and a pivotally mounted gage mounted above and in advance of the said cutter and knife and consisting of a series of spaced fingers, the lower ends of which operate above the plane of said knife and cutter and are adapted to contact with the beets, and means for adjusting said gage on its pivot so as to move said fingers toward or from said cutter and knife.

16. The combination with a frame, side bars pivotally connected to the frame and extending rearwardly, upstanding posts pivoted to the rear ends of the side bars, a ground knife carried by the posts, a horizontally acting bladed cutter journaled between the posts and coacting with the knife, brackets extending forwardly from the posts, a tined gage swingingly supported in the brackets, means for adjusting the gage relative to the blades of the cutter, and connections between the posts and the frame for leveling the knife.

17. The combination with a hanger provided with a driven shaft, of side rails pivotally connected at their front ends to said shaft and having bearing collars at their rear ends, vertical posts having rearwardly inclined heel extensions, means for pivotally connecting the upper ends of the posts to the hanger, a stationary ground knife carried by and connecting the said heel extensions and adapted to trail on the ground, bearing collars provided on the posts above the said heel extensions to rotate in the bearing collars of the side rails, a shaft passed through the posts and the bearing collars thereof, a rotary knife mounted on said shaft, gearing mounted on the extended end of said shaft and arranged on the outside of the side rails, and connections between said gearing and the driven shaft.

In testimony, that I claim the foregoing as my own, I have hereto affixed my signature in the presence of two witnesses.

OLIVER P. COMBEST.

Witnesses:
G. L. FRISBEE,
GEORGE R. MOSLEY.